United States Patent
Ji et al.

(10) Patent No.: US 9,848,209 B2
(45) Date of Patent: Dec. 19, 2017

(54) ADAPTIVE ERROR DETECTION FOR MPEG-2 ERROR CONCEALMENT

(75) Inventors: Gang Ji, Bothell, WA (US); Yongjun Wu, Redmond, WA (US); Florin Folta, Redmond, WA (US); Naveen Thumpudi, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1714 days.

(21) Appl. No.: 12/061,567

(22) Filed: Apr. 2, 2008

(65) Prior Publication Data
US 2009/0252233 A1    Oct. 8, 2009

(51) Int. Cl.
| | |
|---|---|
| *H04N 19/46* | (2014.01) |
| *H04N 19/895* | (2014.01) |
| *H04N 19/176* | (2014.01) |
| *H04N 19/134* | (2014.01) |
| *H04N 19/61* | (2014.01) |
| *H04N 19/18* | (2014.01) |

(52) U.S. Cl.
CPC ......... *H04N 19/895* (2014.11); *H04N 19/134* (2014.11); *H04N 19/176* (2014.11); *H04N 19/18* (2014.11); *H04N 19/46* (2014.11); *H04N 19/61* (2014.11)

(58) Field of Classification Search
CPC .... H04N 19/134; H04N 19/176; H04N 19/17; H04N 19/46; H04N 19/61; H04N 19/895
USPC .............................. 375/240.2, 240.25, 240.27
See application file for complete search history.

(56) References Cited

U.S. PATENT DOCUMENTS

| | | | |
|---|---|---|---|
| 5,475,389 A | 12/1995 | Song et al. | |
| 5,568,200 A | 10/1996 | Pearlstein et al. | |
| 5,650,781 A | 7/1997 | Park | |
| 5,724,446 A | 3/1998 | Liu et al. | |
| 6,005,982 A * | 12/1999 | Abe | 382/251 |
| 6,151,034 A | 11/2000 | Jain | |
| 6,272,180 B1 | 8/2001 | Lei | |
| 6,275,239 B1 | 8/2001 | Ezer et al. | |

(Continued)

FOREIGN PATENT DOCUMENTS

| | | |
|---|---|---|
| WO | WO 2006/020019 | 2/2006 |
| WO | WO 2006/111063 | 10/2006 |

(Continued)

OTHER PUBLICATIONS

The Microsoft Team, "Microsoft XP Professional Resource Kit" 2nd Edition, Jun. 11, 2003.*

(Continued)

*Primary Examiner* — Stephen J Clawson
(74) *Attorney, Agent, or Firm* — Klarquist Sparkman, LLP

(57) ABSTRACT

A decoder which can detect errors in MPEG-2 coefficient blocks can identify syntactically-correct blocks which have out-of-bounds coefficients. The decoder computes coefficient bounds based on quantization scalers and quantization matrices and compares these to coefficient blocks during decoding; if a block has out-of-bounds coefficients, concealment is performed on the block. In a decoder implemented all in software, coefficient bounds checking is performed on iDCT coefficients against upper and lower bounds in a spatial domain. In a decoder which performs iDCT in hardware, DCT coefficients are compared to an upper energy bound.

23 Claims, 7 Drawing Sheets

(56) References Cited

U.S. PATENT DOCUMENTS

| | | |
|---|---|---|
| 6,275,964 B1 | 8/2001 | Nagin et al. |
| 6,323,904 B1 | 11/2001 | Knee |
| 6,404,817 B1 | 6/2002 | Saha et al. |
| 6,417,910 B1 | 7/2002 | Mead |
| 6,470,049 B1 | 10/2002 | Nguyen |
| 6,507,614 B1* | 1/2003 | Li .......................... 375/240.03 |
| 6,522,694 B1 | 2/2003 | Ryan |
| 6,748,020 B1 | 6/2004 | Eifrig et al. |
| 6,763,192 B1 | 7/2004 | Jagannathan |
| 6,993,202 B2 | 1/2006 | Igarashi et al. |
| 7,068,722 B2 | 6/2006 | Wells |
| 7,113,542 B2 | 9/2006 | Tanaka |
| 7,149,247 B2 | 12/2006 | Sullivan |
| 7,184,100 B1 | 2/2007 | Wilf et al. |
| 7,496,282 B2 | 2/2009 | Kochale |
| 7,500,240 B2 | 3/2009 | Shoemaker |
| 7,707,334 B2 | 4/2010 | Wang et al. |
| 7,742,532 B2 | 6/2010 | Jeon |
| 7,751,473 B2 | 7/2010 | Hannuksela |
| 7,792,374 B2 | 9/2010 | Ohira |
| 8,300,702 B2 | 10/2012 | Yamazaki |
| 2002/0069038 A1 | 6/2002 | Cooper |
| 2002/0131647 A1* | 9/2002 | Matthews .................... 382/268 |
| 2002/0141502 A1 | 10/2002 | Lin et al. |
| 2003/0112333 A1* | 6/2003 | Chen et al. .................. 348/192 |
| 2003/0156652 A1 | 8/2003 | Wise et al. |
| 2004/0032908 A1 | 2/2004 | Hagai et al. |
| 2004/0047614 A1 | 3/2004 | Green |
| 2004/0101055 A1* | 5/2004 | Hourunranta ............ 375/240.24 |
| 2004/0139462 A1 | 7/2004 | Hannuksela et al. |
| 2004/0185775 A1 | 9/2004 | Bell et al. |
| 2004/0190617 A1 | 9/2004 | Shen et al. |
| 2004/0247030 A1 | 12/2004 | Wiethoff |
| 2004/0258151 A1* | 12/2004 | Spampinato ........... H04N 19/61 375/240.03 |
| 2005/0025463 A1 | 2/2005 | Bloom et al. |
| 2005/0089104 A1 | 4/2005 | Kim |
| 2005/0094729 A1 | 5/2005 | Yuan et al. |
| 2005/0123057 A1 | 6/2005 | MacInnis et al. |
| 2005/0232359 A1 | 10/2005 | Cha |
| 2005/0278502 A1 | 12/2005 | Hundley |
| 2006/0002479 A1 | 1/2006 | Fernandes |
| 2006/0013318 A1 | 1/2006 | Webb et al. |
| 2006/0039475 A1 | 2/2006 | Liu et al. |
| 2006/0045190 A1 | 3/2006 | Sun et al. |
| 2006/0059510 A1 | 3/2006 | Huang et al. |
| 2006/0062304 A1* | 3/2006 | Hsia ......................... 375/240.16 |
| 2006/0088107 A1* | 4/2006 | Cancemi et al. ......... 375/240.27 |
| 2006/0098732 A1 | 5/2006 | Bruna et al. |
| 2006/0104366 A1 | 5/2006 | Huang et al. |
| 2006/0133770 A1 | 6/2006 | Shibata et al. |
| 2006/0146940 A1 | 7/2006 | Gomila et al. |
| 2006/0233239 A1 | 10/2006 | Sethi et al. |
| 2006/0251177 A1 | 11/2006 | Webb |
| 2007/0014359 A1 | 1/2007 | Gomila et al. |
| 2007/0030911 A1 | 2/2007 | Yoon |
| 2007/0033494 A1 | 2/2007 | Wenger et al. |
| 2007/0053445 A1 | 3/2007 | Schaar et al. |
| 2007/0073779 A1 | 3/2007 | Walker et al. |
| 2007/0086526 A1 | 4/2007 | Koto et al. |
| 2007/0091997 A1 | 4/2007 | Fogg et al. |
| 2007/0098080 A1 | 5/2007 | Diard et al. |
| 2007/0116128 A1 | 5/2007 | Evans et al. |
| 2007/0118544 A1 | 5/2007 | Lundquist et al. |
| 2007/0136779 A1 | 6/2007 | Tsushima |
| 2007/0153898 A1 | 7/2007 | Yim |
| 2007/0177678 A1 | 8/2007 | Subramania et al. |
| 2007/0211055 A1 | 9/2007 | Stein et al. |
| 2007/0223595 A1 | 9/2007 | Hannuksela |
| 2007/0242080 A1 | 10/2007 | Hamada |
| 2008/0002773 A1 | 1/2008 | Lai |
| 2008/0049844 A1 | 2/2008 | Liu et al. |
| 2008/0049845 A1 | 2/2008 | Liu |
| 2008/0107184 A1 | 5/2008 | Katsavounidis et al. |
| 2008/0130754 A1 | 6/2008 | Winger |
| 2009/0052858 A1 | 2/2009 | Date |
| 2009/0074075 A1 | 3/2009 | Au |
| 2012/0147956 A1 | 6/2012 | Katsavounidis et al. |
| 2013/0077690 A1 | 3/2013 | Wei et al. |

FOREIGN PATENT DOCUMENTS

| | | |
|---|---|---|
| WO | WO 2006/111915 | 10/2006 |
| WO | WO 2006/134110 | 12/2006 |

OTHER PUBLICATIONS

Nemethova et al., "Flexible Error Concealment for H.264 Based on Directional Interpolation," *IEEE*, 6 pp. (2005).

Patel et al., "Performance of a Software MPEG Video Decoder," *ACM Proc.*, 8 pp. (1993).

Shen et al., "Accelerate Video Decoding With Generic GPU," *IEEE Transactions on Circuits and Systems for Video Technology*, vol. 15, No. 5, pp. 685-693 (May 2005).

Su et al., "Improved Error Concealment Algorithms Based on H.264/AVC Non-normative Decoder," *IEEE*, 4 pp. (2004).

Thomos et al., "Error-resilient transmission of H.264/AVC streams using flexible macroblock ordering," *IEEE*, 7 pp. (2005).

Chung et al., "DCT Based Error Concealment for RTSP Video Over a Modem Internet Connection," *Proceedings of the 1998 IEEE International Symposium on Circuits and Systems*, 1998, 4 pp.

Lee et al., "Error-Resilient Image Coding (ERIC) with Smart-IDCT Error Concealment Technique for Wireless Multimedia Transmission," *IEEE Transactions on Circuits and Systems for Video Technology*, vol. 13, No. 2, Feb. 2003, pp. 176-181.

Park et al., "Content-Based Adaptive Spatio-Temporal Methods for MPEG Repair," *IEEE Transactions on Image Processing*, vol. 13, No. 8, Aug. 2004, pp. 1066-1077.

Swann, "Resilient Video Coding for Noisy Channels," *IEEE Colloquium on Data Compression: Methods and Implementations*, 1999, 5 pp.

Bordoloi et al., "Hardware Accelerated Interactive Vector Field Visualization: A level of detail approach," *Eurographics* 2002, vol. 21, No. 3, 10 pp. (2002).

Digit-Life, "AMD/ATI and NVIDIA Graphics Cards in Video Decoding Tasks," Jun. 25, 2007, http://www.digit-life.com/articles2/video/video.dec.2007-page1.html, 9 pages.

Fiedler, "Implementation of a Basic H.264/AVC Decoder," Chemnitz University of Technology, Faculty of Computer Science, Seminar Paper, 28 pp., Jun. 1, 2004.

Geomantics, "GenesisIV Tutorial: Startup issues," http://www.geomantics.com/tutorial22.htm, visited on Sep. 24, 2008, 3 pages.

"H.264/MPEG-4 AVC," Wikipedia, 8 pp., May 27, 2009. http://en.wikipedia.org/wiki/H.264.

Marpe, "The H.264/MPEG4 Advanced Video Coding Standard and Its Applications," IEEE Communications Magazine, Standards Report, 10 pp., Aug. 2006.

Microsoft Corporation, "Error Message: CONF Caused a Divide Error in Module Msvfw32.dll," http://support.microsoft.com/kb/263031, Oct. 2006, 2 pages.

Sonic Solutions, "CinePlayer™ DVD Decoder Pack for Windows® XP," http://www.sonic.com/products/Consumer/CinePlayer/Technology/acceleration.aspx, © 2007, visited on Sep. 24, 2008, 10 pages.

Sullivan, "Seven Steps Toward a More Robust Codec Design," JVT-C117, 7 pp. (May 2002).

Sullivan et al., "The H.264/AVC Advanced Video Coding Standard: Overview and Introduction to the Fidelity Range Extensions," SPIE Conference on Applications of Digital Image Processing XXVII, Special Session on Advances in the New Emerging Standard, 21 pp., Aug. 2004.

The Elder Geek on Windows XP, "Camtasia Why Playback is Black" http://www.theeldergeek.com/forum/lofiversion/index.php?t15009.html, Dec. 2005, 5 pages.

Wang et al., "A Platform-Based MPEG-4 Advanced Video Coding (AVC) Decoder with Block Level Pipelining," *Proceedings of the 2003 Joint Conference of the Fourth International Conference on*

(56) References Cited

OTHER PUBLICATIONS

*Information, Communications and Signal Processing, and the Fourth Pacific Rim Conference on Multimedia*, vol. 1, Issue 15-18, pp. 51-55, Dec. 2003.

Wang et al., "Isolated Regions: Motivations, Problems, and Solutions," JVT-0072, 13 pp. (May 2002).

Wang et al., "Real-time Video Communications over Unreliable Networks," *IEEE Signal Processing Magazine*, vol. 17, No. 4, pp. 61-82 (Jul. 2000).

* cited by examiner software 180 implementing one or more MPEG-2 error detection innovations

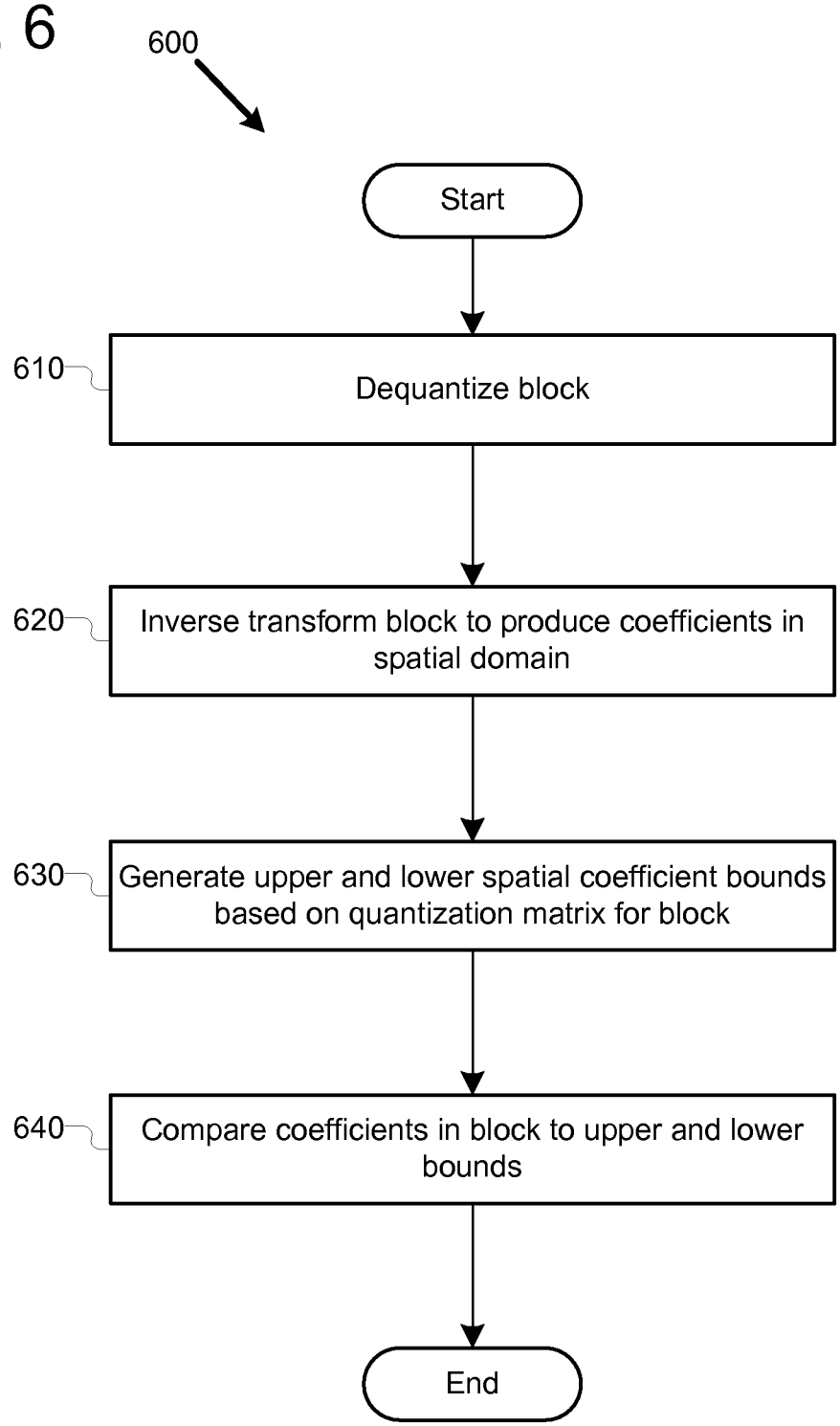

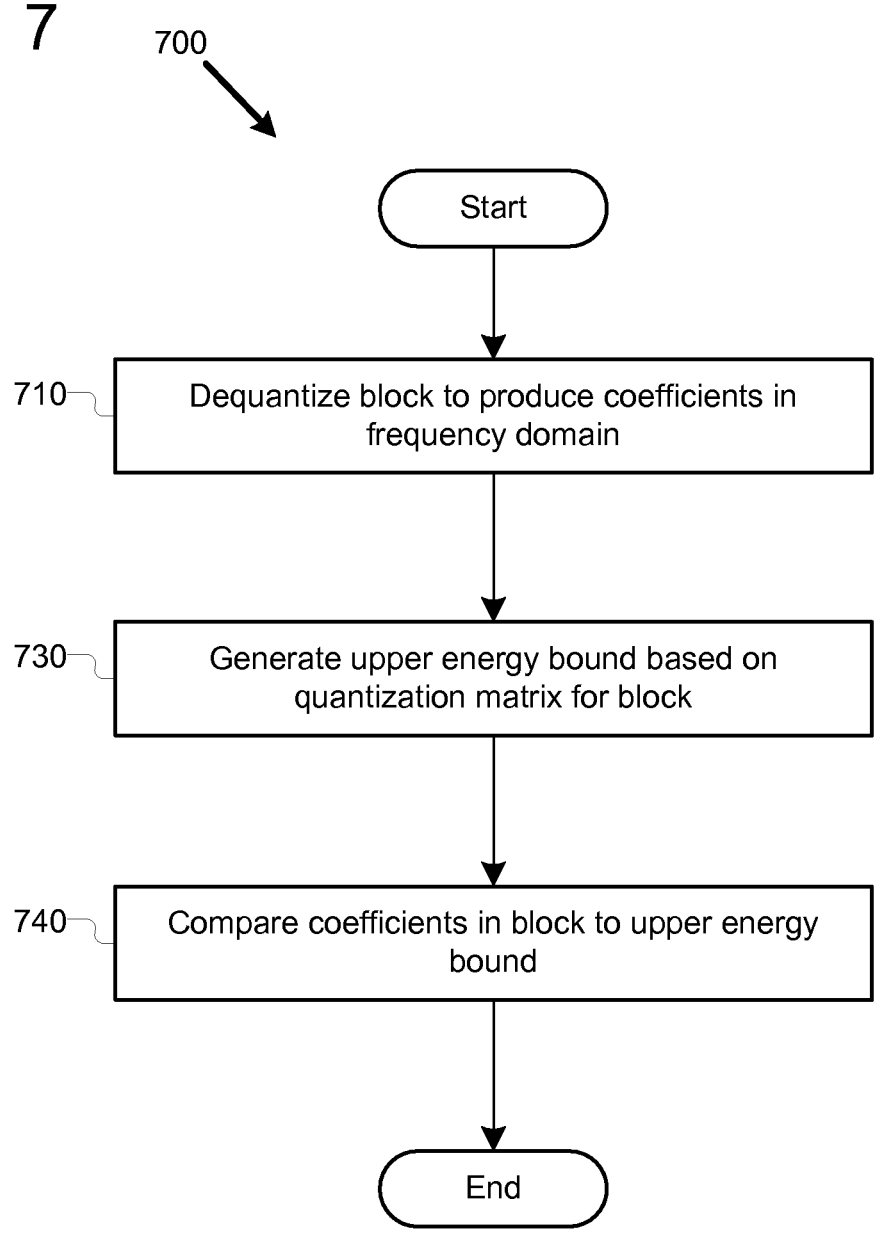

ADAPTIVE ERROR DETECTION FOR MPEG-2 ERROR CONCEALMENT

BACKGROUND

Engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system.

Intra-Picture Compression and Inter-Picture Compression

In general, video compression techniques include "intra-picture" compression and "inter-picture" compression. Intra-picture compression techniques compress an individual picture without reference to other pictures that have been compressed and reconstructed. Inter-picture compression techniques compress a picture with reference to preceding and/or following picture(s) (often called reference or anchor pictures) that have already been compressed and reconstructed.

Most encoders use at least one type of frequency transform during intra-picture compression and inter-picture compression, such a discrete cosine transforma ("DCT"). For example, the encoder splits the key picture into non-overlapping blocks of samples and applies a forward frequency transform to individual blocks. The frequency transform maps the sample values of a block to transform coefficients, which are coefficients of basis functions that correspond to frequency components. In particular, the lowest frequency coefficient—called the DC coefficient—indicates the average sample value for the block. The other coefficients—called AC coefficients—indicate patterns of changes in sample values in the block, from gradual low-frequency variations across the block to sharper high-frequency variations within the block. In many encoding scenarios, a relatively small number of frequency coefficients (e.g., the DC coefficient and lower frequency AC coefficients) capture much of the energy or signal content in the block. The encoder quantizes the transform coefficients, resulting in a block of quantized transform coefficients. The encoder further encodes the quantized transform coefficients, for example, using entropy coding, and outputs a bitstream of compressed video information.

In corresponding decoding, a decoder reads the bitstream of compressed video information and performs operations to reconstruct the pictures that were encoded. When the encoding uses lossy compression (e.g., in quantization), the reconstructed pictures approximate the source pictures that were encoded but are not exactly the same. For example, to reconstruct a version of the original 8×8 block of the key picture, the decoder reconstructs quantized transform coefficients using entropy decoding. The decoder inverse quantizes the quantized transform coefficients of the block and applies an inverse frequency transform (such as inverse discrete cosine transform or "iDCT") to convert coefficients from a frequency domain to a pixel (or "spatial") domain, producing the reconstructed version of the original 8×8 block. Typically, an encoder also reconstructs encoded pictures, for use in subsequent motion compensation.

Inter-picture compression techniques often use motion compensation to reduce bit rate by exploiting temporal redundancy in video. In general, motion compensation is a process of producing predictions from reference picture(s) (such as previously encoded/decoded key picture(s)) using motion data. An encoder and decoder store previously coded/decoded pictures in a picture store. The reference pictures in the picture store can then provide motion-compensated predictor blocks for the blocks of a current picture being encoded. Often, the encoder does not find a perfect match. For this reason, the encoder computes the sample-by-sample difference between the current block and its motion-compensated prediction to determine a residual (also called error signal). The residual is frequency transformed, quantized, and entropy encoded.

When reconstructing residuals, the encoder reconstructs transform coefficients that were quantized and performs an inverse frequency transform. The encoder performs motion compensation to compute motion-compensated predictors, and combines the predictors with the residuals. During decoding, a decoder entropy decodes information and performs analogous operations to reconstruct residuals, perform motion compensation, and combine the predictors with the reconstructed residuals.

Examples of Quantization

According to one possible definition, quantization is a term used for an approximating non-reversible mapping function commonly used for lossy compression, in which there is a specified set of possible output values, and each member of the set of possible output values has an associated set of input values that result in the selection of that particular output value. A variety of quantization techniques have been developed, including scalar or vector, uniform or non-uniform, and adaptive or non-adaptive quantization.

Quantization can affect the fidelity with which the transform coefficients are encoded, which in turn can affect bit rate. Coarser quantization tends to decrease fidelity to the original transform coefficients (and produce more distortion) as the coefficients are more coarsely approximated. Bit rate also decreases, however, when decreased complexity can be exploited with lossless compression (e.g., entropy encoding). Conversely, finer quantization tends to preserve fidelity and quality (and produce less distortion) but result in higher bit rates.

Some encoders adjust quantization between pictures and/or within pictures to control where distortion is introduced. For a given bit rate/quality level, this allows an encoder to introduce more distortion where it will be less visible and/or avoid introducing distortion where it would be more visible. The allocation of available bits among pictures and within pictures plays an important role in how distortion is introduced and how the user perceives the quality of the video.

Different encoders typically apply different quantization rules, but there are some common principles. Quantization can produce visible artifacts that tend to be more artificial-looking and visually distracting than simple loss of fine detail. For example, the human visual system is more sensitive to distortion in relatively smooth content than to distortion in textured content. High texture levels tend to mask quality degradation and quantization artifacts. On the other hand, in regions with lower texture levels (e.g., smooth regions), degradation and quantization artifacts tend to be more visible. In other words, in smooth regions distortion may create a visible line, step or other flaw in the reconstructed image, while the same amount of distortion may not create noticeable flaws in textured areas due to masking effects of surrounding detail.

Thus, a common strategy is to allocate relatively more bits to smooth content and relatively fewer bits to textured content, so that lower distortion is introduced in smooth content at the expense of more distortion in the textured content (where the distortion is not as perceptually noticeable). To identify textured content and non-textured content, various texture metrics have been used (including those that measure the variation in intensity of sample values in different ways), and various texture thresholds have been used (including static thresholds and thresholds that automatically adjust depending on the presence of dominant texture content in a picture). In some cases, an encoder varies a quantization step size parameter depending on texture. This allows the encoder to coarsen quantization when doing so will not dramatically increase perceptibility of the distortion and use finer quantization in other situations.

Different encoders typically use different parameters for quantization. In many encoders, a step size of quantization is set for a macroblock, block, picture, or other unit of video. The extent of quantization is parameterized in terms of the quantization step size, which is adapted to regulate quality and/or bit rate. Coarser quantization uses larger quantization step sizes. Finer quantization uses smaller quantization step sizes. Often, for purposes of signaling and reconstruction, quantization step sizes are parameterized as multiples of a smallest quantization step size, using a quantization scaler. Various video standards allow the use of different quantization step sizes for different picture types, and allow variation of quantization step sizes for rate and quality control for different parts of a picture. In some cases, this involves varying quantization scalers on a macroblock level, block level, or other sub-picture level. The encoder makes decisions on how to vary the QPs, and signals those decisions, as appropriate, to a decoder.

In addition, quantization matrices are oftentimes used to quantize different coefficients in a block after transform. A typical quantization matrix will indicate, for each coefficient after transform in a block, the coarseness of the quantization that is to be performed. Oftentimes, a quantization matrix is used along with a quantization scaler, such as by multiplying the quantization matrix with the quantization scaler. One reason that this is done is so that a relatively small set of potential quantization matrices, which are known ahead of time, can be coded and used without using bits to send the quantization matrix itself. This lowers bitrate, and allows the quantization matrix to be scaled up or down as desired by adjusting the quantization scaler.

Some standards and products support selection between different reconstruction rules. For example, in some systems, a decoder can switch between a "uniform" quantizer reconstruction rule and a "non-uniform" quantizer reconstruction rule. In some cases, for a given reconstruction rule, standards and products specify reconstruction values that correspond to midpoint reconstruction for the sake of simplicity.

Video decoding can be complicated as well. Because video bitstream creation involves a great deal of data manipulation and representation, and because data transmission is not perfect, many existing video decoding systems receive data that is corrupted, incomplete, or otherwise not acceptable to use when generating video. For example, when receiving video that is being streamed over the Internet or via satellite, packets may be lost or bits flipped which result in errors during rendering. Various systems, including MPEG-2-compliant decoders, attempt to discover these corrupted blocks and utilize concealment techniques which allow the decoders to drop (e.g. not render) the corrupted block while continuing to display video that is acceptable to a user.

However, many of these bad blocks are only recognized by their lack of conformity with a particular encoding scheme's syntax. Hence, for example, if a bit is left out of a particular Huffman code, a decoder may recognize that the resulting code does not match any Huffman code known to it. The decoder would then flag the block as in error and attempt to conceal it. While some corrupt blocks are discovered by these syntax-based methods, other blocks may exist which contain errors but which still manage to show a proper syntax for the encoding method. Syntax-based error detection would not catch these errors, resulting in either badly distorted video or potentially crashed video decoder software. This is of particular interest in MPEG-2-based systems, such as many cable and satellite television systems, which commonly suffer from transmission errors and for which a robust error detection system is highly desirable. Thus, whatever the benefits of previous video error detection techniques, however, they do not have the advantages of the following techniques and tools.

SUMMARY

A decoder is described which can detect errors in, for example, MPEG-2 coefficient blocks, even in syntactically-correct blocks, by checking for out-of-bounds coefficients. The decoder computes bounds on coefficients based on quantization scalers and quantization matrices and compares these to coefficient blocks during decoding; if a block has out-of-bounds coefficients, concealment is performed on the block. The mode of coefficient checking varies depending on the decoder implementation. In a decoder implemented all in software, the decoder performs coefficient bounds checking on iDCT coefficients against upper and lower bounds in a spatial domain. In a decoder which performs iDCT in hardware, the decoder performs checking DCT coefficients against an upper energy bound in a frequency domain.

In one implementation, a method for detecting an error in a syntactically-correct MPEG-2 bitstream is described. The method comprises receiving a syntactically-correct block of an MPEG-2 bitstream, computing a coefficient bound value from a quantization matrix and quantization scaler associated with the block, and determining upper and lower bounds for spatial coefficients with associated with the block. The method also comprises performing dequantization and inverse discrete cosine transform on the block to generate a block of a spatial coefficients, comparing spatial coefficients in the block of spatial coefficients with the upper and lower bounds, and, when the spatial coefficients in the block fall outside of the upper or lower bounds, concealing the block when displaying the bitstream.

In another implementation, a method for determining if a video block contains an error is described. The method comprises computing a coefficient bound based on a quantization matrix for the video block comparing coefficients derived from the video block to the coefficient bound, and determining that one or more coefficients derived from the video block are in error based on the coefficient bound.

In another implementation, computer-readable media are described which contain instructions which, when executed, cause a computer to perform a method for determining if a video block in a video bitstream contains an error. The method comprises dequantizing the video block using a quantization matrix, computing one or more coefficient bounds based on the quantization matrix, comparing coefficients from the dequantized video block to the one or more coefficient bounds, determining that one or more coefficients from the dequantized video block are in error based on the one or more coefficient bounds, and concealing the block when rendering the video bitstream.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be made apparent from the following detailed description of embodiments that proceeds with reference to the accompanying drawings.

BRIEF DESCRIPTION OF THE DRAWINGS

FIG. 6 is a flowchart illustrating an example process for detecting blocks containing errors in a spatial domain.

FIG. 7 is a flowchart illustrating an example process for detecting blocks containing errors in a frequency domain.

DETAILED DESCRIPTION

Figure 1:
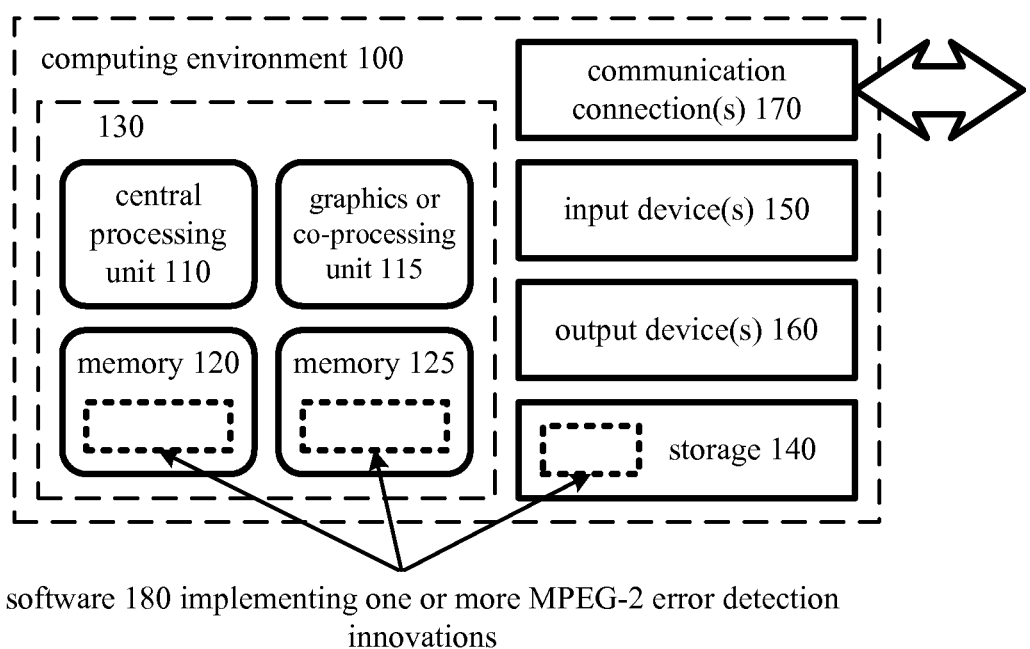
FIG. 1 is a block diagram illustrating a generalized example of a suitable computing environment in which several of the described embodiments may be implemented.

The present application relates to innovations in error detection in video decoders. Many of these innovations increase error detection during MPEG-2 video decoding. One innovation includes the generation of upper and lower bounds for spatial iDCT coefficients based on quantization matrices and quantization scalers. Another innovation includes the generation of upper and lower bounds for DCT coefficients in a frequency domain based on quantization matrices and quantization scalers. Another innovation includes the ability to detect blocks of video coefficients that contain errors despite being syntactically correct.

For example, an error detection bounds checker in an MPEG-2 decoder computes upper and lower bounds for a block of iDCT coefficients. The bounds checker does this by computing theoretical maximum quantization errors based on its knowledge of quantization matrices and quantization scalers. If the iDCT coefficients, which are pixel or residual values in a spatial domain, are found to lie outside the upper or lower bound for the block, the decoder knows the block has an error, even if the block matches the proper MPEG-2 syntax. The decoder can then perform a concealment technique for the block rather than decoding it.

In another example, an error detection bounds checker in an MPEG-2 decoder using Direct X Video Accelleration ("DXVA") computes upper and lower bounds for a block of DCT coefficients before the coefficients are sent to a hardware decoder. If the DCT coefficients, which lie in a frequency domain, are found to lie outside the upper or lower bound for the block, the decoder knows the block has an error, again even if the block matches the proper MPEG-2 syntax. As before, the decoder can then perform a concealment technique for the block rather than decoding it.

Various alternatives to the implementations described herein are possible. For example, certain techniques described with reference to flowchart diagrams can be altered by changing the ordering of stages shown in the flowcharts, by repeating or omitting certain stages, etc., while achieving the same result. As another example, although some implementations are described with reference to specific macroblock formats, other formats also can be used. As another example, while several of the innovations described below are presented in terms of MPEG-2 decoding examples, the innovations are also applicable to other types of decoders (e.g., H.264/AVC, VC-1) that provide or support the same or similar decoding features.

The various techniques and tools described herein can be used in combination or independently. For example, although flowcharts in the figures typically illustrate techniques in isolation from other aspects of decoding, the illustrated techniques in the figures can typically be used in combination with other techniques (e.g., shown in other figures). Different embodiments implement one or more of the described techniques and tools. Some of the techniques and tools described herein address one or more of the problems noted in the Background. Typically, a given technique/tool does not solve all such problems, however. Rather, in view of constraints and tradeoffs in decoding time and/or resources, the given technique/tool improves performance for a particular implementation or scenario.

Computing Environment

FIG. 1 illustrates a generalized example of a suitable computing environment 100 in which several of the described embodiments may be implemented. The computing environment 100 is not intended to suggest any limitation as to scope of use or functionality, as the techniques and tools may be implemented in diverse general-purpose or special-purpose computing environments.

With reference to FIG. 1, the computing environment 100 includes at least one CPU 110 and associated memory 120 as well as, in some implementations, at least one GPU or other co-processing unit 115 and associated memory 125 used for video acceleration. In FIG. 1, this basic configuration 130 is included within a dashed line. The processing unit 110 executes computer-executable instructions and may be a real or a virtual processor. In a multi-processing system, multiple processing units execute computer-executable instructions to increase processing power. A host encoder or decoder process offloads certain computationally intensive operations (e.g., iDCT) to the GPU 115. The memory 120, 125 may be volatile memory (e.g., registers, cache, RAM), non-volatile memory (e.g., ROM, EEPROM, flash memory, etc.), or some combination of the two. The memory 120, 125 stores software 180 for a decoder implementing one or more of the decoder error detection innovations described herein.

A computing environment may have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 may be removable or non-removable, and includes magnetic disks, magnetic tapes or cassettes, CD-ROMs, DVDs, Blu-Ray discs, or any other medium which can be used to store information and which can be accessed within the computing environment 100. The storage 140 stores instructions for the software 180.

The input device(s) 150 may be a touch input device such as a keyboard, mouse, pen, or trackball, a voice input device, a scanning device, or another device that provides input to the computing environment 100. For audio or video encoding, the input device(s) 150 may be a sound card, video card, TV tuner card, or similar device that accepts audio or video input in analog or digital form, or a CD-ROM, CD-RW, DVD-RW, or other device that reads audio or video samples into the computing environment 100. The output device(s) 160 may be a display, printer, speaker, CD- or DVD-writer, or another device that provides output from the computing environment 100.

The communication connection(s) 170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 100, computer-readable media include memory 120 and/or storage.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "identify," and "receive" to describe computer operations in a computing environment. These terms are high-level abstractions for operations performed by a computer, and should not be confused with acts performed by a human being. The actual computer operations corresponding to these terms vary depending on implementation.

Examples of a Generalized Video Encoder

Figure 2:
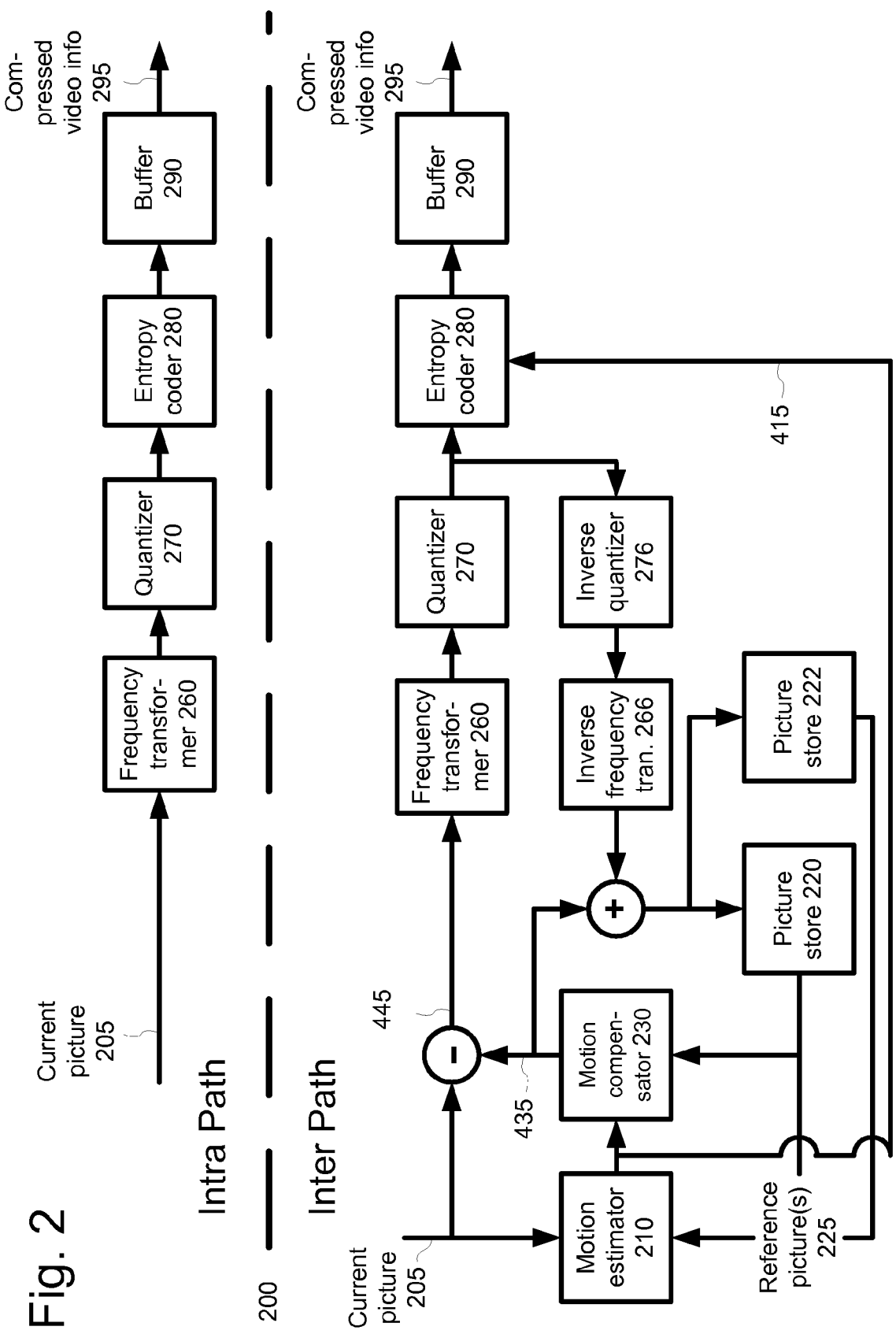
FIG. 2 is a block diagram of a generalized video encoder in conjunction with which several of the described embodiments may be implemented.

FIG. 2 is a block diagram of a generalized video encoder 200. The encoder 200 receives a sequence of video pictures including a current picture 205 and produces compressed video information 295 as output to storage, a buffer, or a communications connection. The format of the output bitstream as described herein is an MPEG-2 format. In alternative implementations, the output may be can be a Windows Media Video or SMPTE 421M format, other MPEG-x format (e.g., MPEG-1 or MPEG-4), H.26x format (e.g., H.261, H.262, H.263, or H.264), or other format, such as RMVB.

The encoder 200 processes video pictures. The term picture generally refers to source, coded or reconstructed image data. For progressive video, a picture is a progressive video frame. For interlaced video, a picture may refer to an interlaced video frame, the top field of the frame, or the bottom field of the frame, depending on the context. The encoder 200 is block-based and uses a 4:2:0 macroblock format for frames, with each macroblock including four 8×8 luma blocks (at times treated as one 16×16 macroblock) and two 8×8 chroma blocks. For fields, the same or a different macroblock organization and format may be used. The 8×8 blocks may be further sub-divided at different stages, e.g., at the frequency transform and entropy encoding stages. The encoder 200 can perform operations on sets of samples of different size or configuration than 8×8 blocks and 16×16 macroblocks. Alternatively, the encoder 200 is object-based or uses a different macroblock or block format.

Returning to FIG. 2, the encoder system 200 compresses predicted pictures and intra-coded, key pictures. For the sake of presentation, FIG. 2 shows a path for key pictures through the encoder system 200 and a path for predicted pictures. Many of the components of the encoder system 200 are used for compressing both key pictures and predicted pictures. The exact operations performed by those components can vary depending on the type of information being compressed.

A predicted picture (e.g., progressive P-frame or B-frame, interlaced P-field or B-field, or interlaced P-frame or B-frame) is represented in terms of prediction from one or more other pictures (which are typically referred to as reference pictures or anchors). A prediction residual is the difference between predicted information and corresponding original information. In contrast, a key picture (e.g., progressive I-frame, interlaced I-field, or interlaced I-frame) is compressed without reference to other pictures.

If the current picture 205 is a predicted picture, a motion estimator 210 estimates motion of macroblocks or other sets of samples of the current picture 205 with respect to one or more reference pictures. The picture store 220 buffers a reconstructed previous picture 225 for use as a reference picture. When multiple reference pictures are used, the multiple reference pictures can be from different temporal directions or the same temporal direction. The motion estimator 210 outputs as side information motion information 215 such as differential motion vector information.

The motion compensator 230 applies reconstructed motion vectors to the reconstructed (reference) picture(s) 225 when forming a motion-compensated current picture 235. The difference (if any) between a block of the motion-compensated current picture 235 and corresponding block of the original current picture 205 is the prediction residual 245 for the block. During later reconstruction of the current picture, reconstructed prediction residuals are added to the motion-compensated current picture 235 to obtain a reconstructed picture that is closer to the original current picture 205. In lossy compression, however, some information is still lost from the original current picture 205. Alternatively, a motion estimator and motion compensator apply another type of motion estimation/compensation.

A frequency transformer 260 converts spatial domain video information into frequency domain (i.e., spectral, transform) data. For block-based video pictures, the frequency transformer 260 applies a DCT, variant of DCT, or other forward block transform to blocks of the samples or prediction residual data, producing blocks of frequency transform coefficients. Alternatively, the frequency transformer 260 applies another conventional frequency transform such as a Fourier transform or uses wavelet or sub-band analysis. The frequency transformer 260 may apply an 8×8, 8×4, 4×8, 4×4 or other size frequency transform.

A quantizer 270 then quantizes the blocks of transform coefficients. The quantizer 270 applies non-uniform, scalar quantization to the frequency domain data with a step size that varies on a picture-by-picture basis or other basis. The quantizer 270 can also apply another type of quantization to the frequency domain data coefficients, for example, a uniform or adaptive quantization for at least some of the coefficients, or directly quantizes spatial domain data in an encoder system that does not use frequency transformations. In described embodiments, the quantizer 270 (in conjunction with other modules such as a rate controller) controls encoding quality for textured, dark smooth and other smooth video content by adjusting quantization step size and/or by choosing particular quantization matrices.

When a reconstructed current picture is needed for subsequent motion estimation/compensation, an inverse quantizer 276 performs inverse quantization on the quantized spectral data coefficients. An inverse frequency transformer 266 performs an inverse frequency transform, producing blocks of reconstructed prediction residuals (for a predicted picture) or samples (for a key picture). If the current picture 205 was a key picture, the reconstructed key picture is taken as the reconstructed current picture (not shown). If the current picture 205 was a predicted picture, the reconstructed prediction residuals are added to the motion-compensated predictors 235 to form the reconstructed current picture. One or both of the picture stores 220, 222 buffers the reconstructed current picture for use in subsequent motion-compensated prediction.

The entropy coder 280 compresses the output of the quantizer 270 as well as certain side information (e.g., motion information 215, quantization step size). Typical entropy coding techniques include arithmetic coding, differential coding, Huffman coding, run length coding, LZ coding, dictionary coding, and combinations of the above. The entropy coder 280 typically uses different coding techniques for different kinds of information, and can choose from among multiple code tables within a particular coding technique.

The entropy coder 280 provides compressed video information 295 to the multiplexer ("MUX") 290. The MUX 290 may include a buffer, and a buffer level indicator may be fed back to a controller. Before or after the MUX 290, the compressed video information 295 can be channel coded for transmission over the network.

A controller (not shown) receives inputs from various modules such as the motion estimator 210, frequency transformer 260, quantizer 270, inverse quantizer 276, entropy coder 280, and buffer 290. The controller evaluates intermediate results during encoding, for example, setting quantization step sizes and performing rate-distortion analysis. The controller works with modules such as the motion estimator 210, frequency transformer 260, quantizer 270, and entropy coder 280 to classify types of content, and to set and change coding parameters during encoding. When an encoder evaluates different coding parameter choices during encoding, the encoder may iteratively perform certain stages (e.g., quantization and inverse quantization) to evaluate different parameter settings. The encoder may set parameters at one stage before proceeding to the next stage. Or, the encoder may jointly evaluate different coding parameters. The tree of coding parameter decisions to be evaluated, and the timing of corresponding encoding, depends on implementation.

The relationships shown between modules within the encoder 200 indicate general flows of information in the encoder; other relationships are not shown for the sake of simplicity. In particular, FIG. 2 usually does not show side information indicating the encoder settings, modes, tables, etc. used for a video sequence, picture, macroblock, block, etc. Such side information, once finalized, is sent in the output bitstream, typically after entropy encoding of the side information.

Particular embodiments of video encoders use a variation or supplemented version of the generalized encoder 200. Depending on implementation and the type of compression desired, modules of the encoder can be added, omitted, split into multiple modules, combined with other modules, and/or replaced with like modules. For example, the controller can be split into multiple controller modules associated with different modules of the encoder. In alternative embodiments, encoders with different modules and/or other configurations of modules perform one or more of the described techniques.

Examples of Acceleration of Video Decoding and Encoding

While some video decoding and encoding operations are relatively simple, others are computationally complex. For example, inverse frequency transforms, fractional sample interpolation operations for motion compensation, in-loop deblock filtering, post-processing filtering, color conversion, and video re-sizing can require extensive computation. This computational complexity can be problematic in various scenarios, such as decoding of high-quality, high-bit rate video (e.g., compressed high-definition video).

Some decoders use video acceleration to offload selected computationally intensive operations to a graphics processor. For example, in some configurations, a computer system includes a primary central processing unit ("CPU") as well as a graphics processing unit ("GPU") or other hardware specially adapted for graphics processing. A decoder uses the primary CPU as a host to control overall decoding and uses the GPU to perform simple operations that collectively require extensive computation, accomplishing video acceleration.

In a typical software architecture for video acceleration during video decoding, a video decoder controls overall decoding and performs some decoding operations using a host CPU. The decoder signals control information (e.g., picture parameters, macroblock parameters) and other information to a device driver for a video accelerator (e.g., with GPU) across an acceleration interface.

The acceleration interface is exposed to the decoder as an application programming interface ("API"). The device driver associated with the video accelerator is exposed through a device driver interface ("DDI"). In an example interaction, the decoder fills a buffer with instructions and information then calls a method of an interface to alert the device driver through the operating system. The buffered instructions and information, opaque to the operating system, are passed to the device driver by reference, and video information is transferred to GPU memory if appropriate. While a particular implementation of the API and DDI may be tailored to a particular operating system or platform, in some cases, the API and/or DDI can be implemented for multiple different operating systems or platforms.

In some cases, the data structures and protocol used to parameterize acceleration information are conceptually separate from the mechanisms used to convey the information. In order to impose consistency in the format, organization and timing of the information passed between the decoder and device driver, an interface specification can define a protocol for instructions and information for decoding according to a particular video decoding standard or product. The decoder follows specified conventions when putting instructions and information in a buffer. The device driver retrieves the buffered instructions and information according to the specified conventions and performs decoding appropriate to the standard or product. An interface specification for a specific standard or product is adapted to the particular bit stream syntax and semantics of the standard/product.

Examples of Video Decoders

Figure 3:
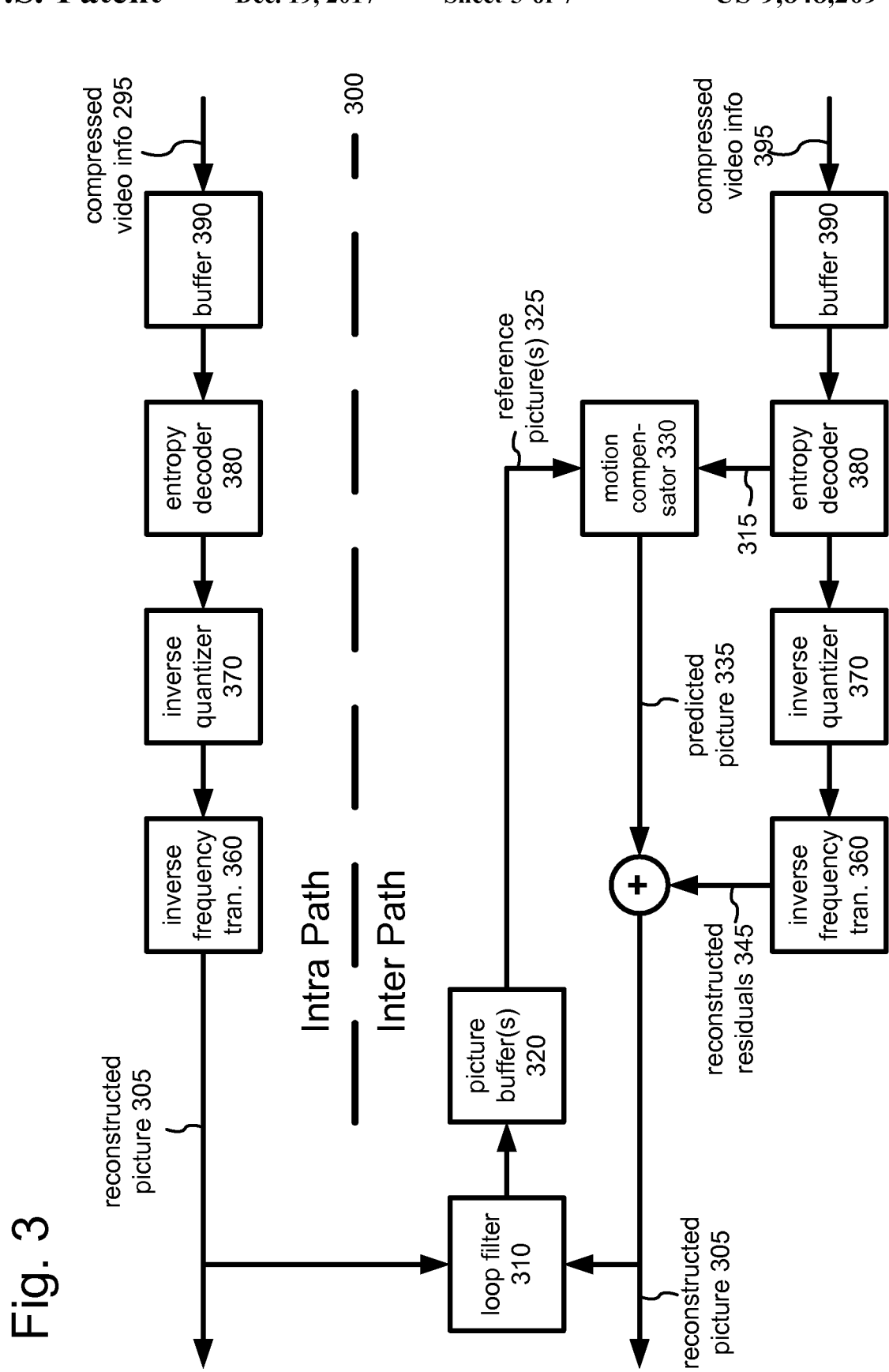
FIG. 3 is a block diagram of a generalized video decoder in conjunction with which several of the described embodiments may be implemented.

FIG. 3 is a block diagram of a generalized video decoder 300 in conjunction with which several described embodiments may be implemented. In one implementation, this decoder corresponds with various aspects of the generalized video encoder discussed above.

The relationships shown between modules within the decoder 300 indicate general flows of information in the decoder; other relationships are not shown for the sake of simplicity. In particular, while a decoder host performs some operations of modules of the decoder 300, in some implementations, a video accelerator performs other operations (such as inverse frequency transforms like iDCT, fractional sample interpolation, motion compensation, in-loop deblocking filtering, color conversion, post-processing filtering and/or picture re-sizing). For example, the decoder 300 passes instructions and information to the video accelerator as described in "Microsoft DirectX VA: Video Acceleration API/DDI," ("DXVA") versions 1.01 or 2.0, a later versions of DXVA or another acceleration interface. In general, once the video accelerator reconstructs video information, it maintains some representation of the video information rather than passing information back. For example, after a video accelerator reconstructs an output picture, the accelerator stores it in a picture store, such as one in memory associated with a GPU, for use as a reference picture. The accelerator then performs in-loop deblock filtering and fractional sample interpolation on the picture in the picture store.

In some implementations, different video acceleration profiles result in different operations being offloaded to a video accelerator. For example, one profile may only offload out-of-loop, post-decoding operations, while another profile offloads in-loop filtering, fractional sample interpolation and motion compensation as well as the post-decoding operations. Still another profile can further offload frequency transform operations. In still other cases, different profiles each include operations not in any other profile.

Returning to FIG. 3, the decoder 300 processes video pictures, which may be video frames, video fields or combinations of frames and fields. The bit stream syntax and semantics at the picture and macroblock levels may depend on whether frames or fields are used. The decoder 300 is block-based and uses a 4:2:0 macroblock format for frames. For fields, the same or a different macroblock organization and format may be used. 8×8 blocks may be further subdivided at different stages. Alternatively, the decoder 300 uses a different macroblock or block format, or performs operations on sets of samples of different size or configuration.

The decoder 300 receives information 395 for a compressed sequence of video pictures and produces output including a reconstructed picture 305 (e.g., progressive video frame, interlaced video frame, or field of an interlaced video frame). The decoder system 300 decompresses predicted pictures and key pictures. For the sake of presentation, FIG. 3 shows a path for key pictures through the decoder system 300 and a path for predicted pictures. Many of the components of the decoder system 300 are used for decompressing both key pictures and predicted pictures. The exact operations performed by those components can vary depending on the type of information being decompressed.

A demultiplexer 390 receives the information 395 for the compressed video sequence and makes the received information available to the entropy decoder 380. The entropy decoder 380 entropy decodes entropy-coded quantized data as well as entropy-coded side information, typically applying the inverse of entropy encoding performed in the encoder. A motion compensator 330 applies motion information 315 to one or more reference pictures 325 to form motion-compensated predictions 335 of sub-blocks, blocks and/or macroblocks of the picture 305 being reconstructed. One or more picture stores store previously reconstructed pictures for use as reference pictures.

The decoder 300 also reconstructs prediction residuals. An inverse quantizer 370 inverse quantizes entropy-decoded data. An inverse frequency transformer 360 converts the quantized, frequency domain data into spatial domain video information. For example, the inverse frequency transformer 360 applies an inverse block transform, such as iDCT, to sub-blocks and/or blocks of the frequency transform coefficients, producing sample data or prediction residual data for key pictures or predicted pictures, respectively. The inverse frequency transformer 360 may apply an 8×8, 8×4, 4×8, 4×4, or other size inverse frequency transform.

For a predicted picture, the decoder 300 combines reconstructed prediction residuals 345 with motion compensated predictions 335 to form the reconstructed picture 305. A motion compensation loop in the video decoder 300 includes an adaptive deblocking filter 323. The decoder 300 applies in-loop filtering 323 to the reconstructed picture to adaptively smooth discontinuities across block/sub-block boundary rows and/or columns in the picture. The decoder stores the reconstructed picture in a picture buffer 320 for use as a possible reference picture.

Depending on implementation and the type of compression desired, modules of the decoder can be added, omitted, split into multiple modules, combined with other modules, and/or replaced with like modules. In alternative embodiments, encoders or decoders with different modules and/or other configurations of modules perform one or more of the described techniques. Specific embodiments of video decoders typically use a variation or supplemented version of the generalized decoder 300.

Figure 4:
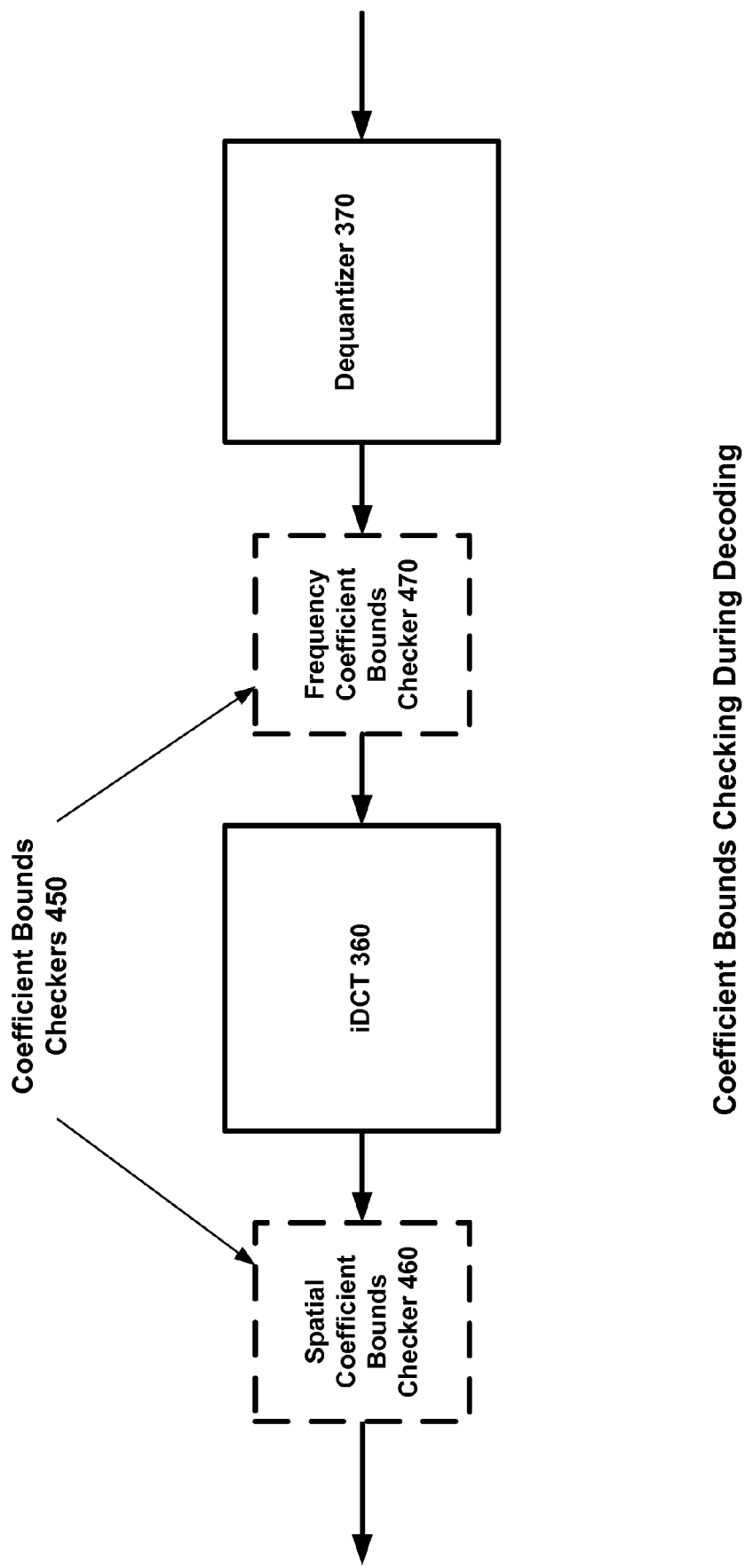
FIG. 4 is a block diagram of a portion of an MPEG-2 video decoder comprising coefficient bounds checkers.

FIG. 4 is a block diagram of error detecting aspects of an MPEG-2 video decoder in conjunction with which several described embodiments may be implemented. In one implementation, this block diagram illustrates particular decoding blocks from a decoder such as that described above with respect to FIG. 3.

In addition to the inverse quantizer 370 (illustrated here as the "dequantizer") and inverse frequency transformer 360 (represented here with an inverse discrete cosine transformer), FIG. 4 illustrates two possible coefficient bounds checkers 450. The coefficient bounds checkers 450 each serve to check video coefficients to determine if they fall between expected upper and lower bounds, providing a check beyond the typical syntax-based error detection normally found in MEPG-2 decoders. In various implementations, the coefficient bounds checkers 450 are implemented as separate components, or may be implemented as sub-components of the dequantizer 370 or the iDCT 360.

The specific coefficient bounds checkers illustrated comprise a spatial coefficient bounds checker 460 and a frequency coefficient bounds checker 470. Because various implementations may use one of the bounds checkers or the other depending on the implementation of the decoder, the bounds checkers are represented with dotted lines. This illustrates that both are not necessarily found in an MPEG-2 decoder which implements the error detection techniques described herein. For example, a decoder implementation utilizing DXVA which performs iDCT in a GPU will utilize the frequency coefficient bounds checker 470 to check DCT coefficients in software in a frequency domain before sending them to the GPU. A decoder that performs iDCT in software, however, will use the spatial coefficient bounds checker 460 to check iDCT coefficients in the spatial domain after inverse transformation. Particular processes performed by the coefficient bounds checkers 450 are described below.

Examples of Error Detection

Figure 5:
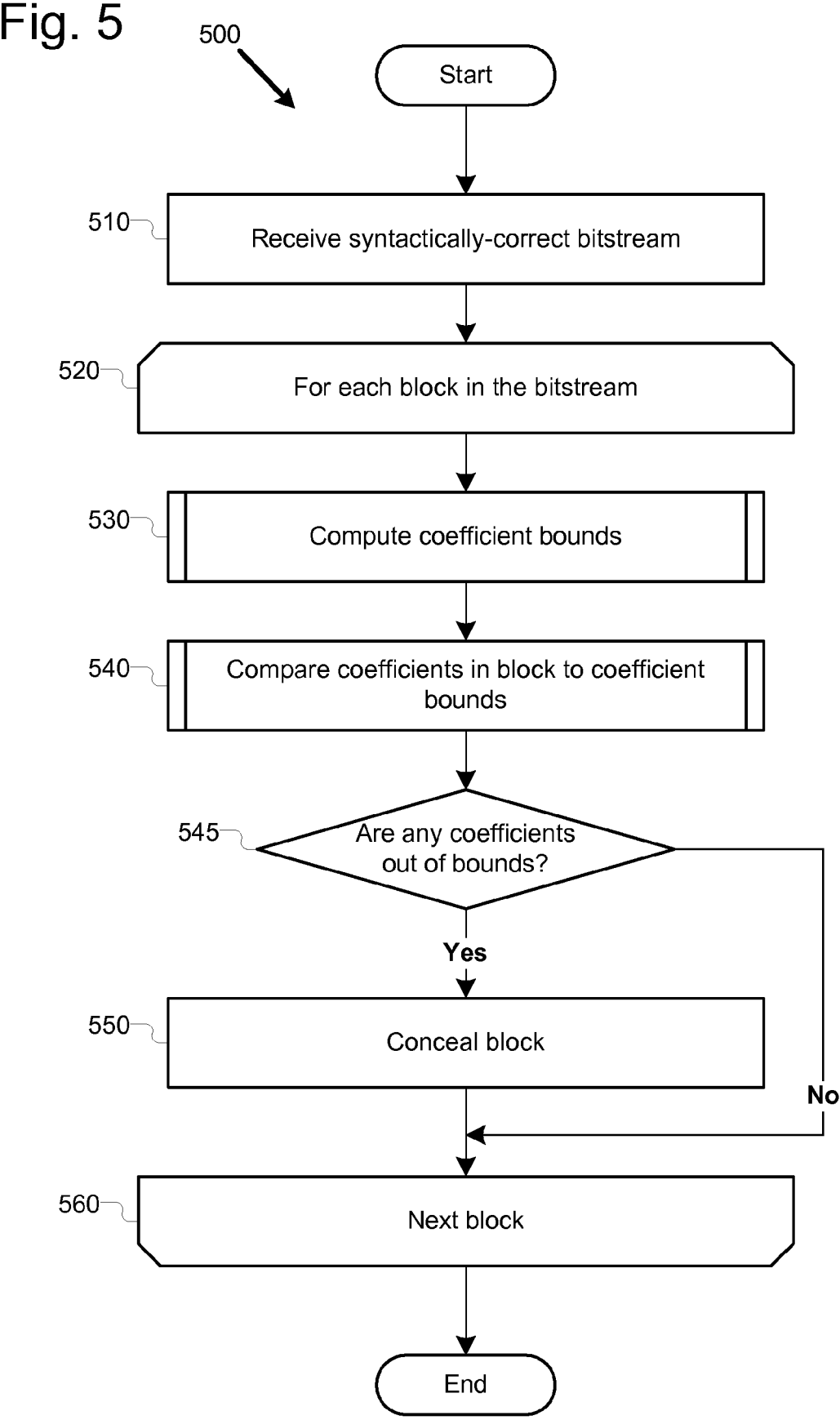
FIG. 5 is a flowchart illustrating an example process for detecting and concealing blocks containing errors.

FIG. 5 is a flowchart illustrating an example process performed by a decoder implementing the error detection techniques described herein for detecting errors in an MPEG-2 bitstream. The process begins at block 510, where the decoder receives a syntactically-correct bitstream. In an alternative implementation, the bit stream may have errors that are corrected to create syntactically-correct video blocks. Next, at loop block 520, the process begins a loop which is performed on every block in the bitstream. Within the loop, at block 530, the bounds checker computes upper and lower coefficient bounds for the block. Then, at block 540, the bound checker compares the coefficients in the block to the computed coefficient bounds.

Particular processes and examples of bounds for various implementations will be described below, but it should be noted that the types of coefficient bounds and the domain in which coefficients are compared may be depend on the particular decoder implementation. Thus, as mentioned above, while a decoder entirely implemented in software may compare coefficients in a spatial domain, a decoder using hardware to perform iDCT, such as a decoder utilizing DXVA, may compute coefficient bounds and compare coefficients in a frequency domain. Additionally, while the illustrated process shows the computation of bounds as taking place for each block, in some implementations, these bounds may actually be computed ahead of time, as they may be based entirely on quantization scalers and quantization matrices, as will be described below. Specifically, in one implementation of the techniques described herein using an MPEG-2 decoder, since a quantization matrix is fixed for a whole sequence and the quantization scaler can be changed for each block, these bounds can be pre-computed once at the beginning of the sequence by assuming a quantization scaler value of 1. Thereafter when decoding the sequence, the bounds can be adjusted by scaling each according to the quantization scaler for each block.

Next, at decision block 545, the bounds checker in the decoder determines if any coefficients in the block are out of the range set by the computed upper and lower bounds. If so, then at block 550, the decoder is instructed to perform concealment on the block, as the block is too corrupt to use. Then, after concealment is or is not performed, the process loops for the next block in the bitstream at loop block 560. The next sections will demonstrate a derivation of useful upper and lower coefficient bounds.

Examples of Spatial Coefficient Bounds Derivation

This section describes an analysis on the theoretical bounds for iDCT coefficients. Through this analysis, it will be shown that if reconstructed iDCT coefficients exceed these theoretical bounds for a block, it means coefficients in the block are corrupted or otherwise in error. While the following analysis is performed in detail to demonstrate the correctness of the described upper and lower bounds, this should not be read to imply that the full analysis must be performed every time coefficients for a block are checked. In fact, the upper and lower coefficient bounds described herein are able to be computed before receipt of a video block, with reference only to the quantization matrix associated with the block and its quantization scaler, as will be shown. Additionally, the analysis proceeds to determine theoretical bounds for coefficients without taking into account saturation and mismatch control, both of which are used in existing MPEG-2 bitstreams. After this derivation, the effects of these techniques will be noted.

According to the MPEG-2 specification, the reconstruction of the DCT coefficients starts with:

$$F''(u,v) = (2Q[F(u,v)] + k)w(u,v)q/32 \quad (1)$$

for 8×8 MPEG-2 blocks, where $Q[F(u, v)]$ is the matrix of quantized coefficients for the block (representing the quantizing operator Q operating on the matrix of original DCT coefficients $F(u, v)$. Also, in the equation, $w(u, v)$ is the quantization weight matrix, q is the quantization scaler, and k takes the value 0 for intra-coded blocks and $Sign(Q[F(u, v)])$ for non-intra blocks as specified in MPEG-2 specifications. However, as discussed above, generally the quantization operator $Q[\ ]$ will cause some quantization errors. The original value of $F(u, v)$, which we refer to as $F_0''(u, v)$, can then be modeled as:

$$F_0''(u,v) = (2Q[F(u,v)] + \delta[u,v] + k)w(u,v)q/32 \quad (2)$$

where $\delta[u, v]$ is a random variable in the range of $[-0.5, 0.5)$ caused by quantization error. From the iDCT reconstruction of the coefficients in MPEG-2, we then have:

$$f_0(x, y) = \frac{2}{N} \sum_{u,v=0}^{N-1} C(u)C(v)F_0''(u, v)\cos\frac{(2x+1)u\pi}{2N}\cos\frac{(2y+1)v\pi}{2N} \quad (3)$$

where $f_0''(x, y)$ is the original value of spatial coefficients. Thus, $f_0''(x, y)$ may be a residual value for an inter-coded block or a pixel value for intra-coded block. Similarly, we can define the quantized reconstruction of $f_0(x, y)$, i.e. $f(x,y)$ as:

$$f(x, y) = \frac{2}{N} \sum_{u,v=0}^{N-1} C(u)C(v)F''(u, v)\cos\frac{(2x+1)u\pi}{2N}\cos\frac{(2y+1)v\pi}{2N} \quad (4)$$

The quantization error in the spatial domain can similarly be modeled as:

$$\Delta(x, y) = \frac{2}{N} \sum_{u,v=0}^{N-1} C(u)C(v)2\delta(u, v)\cos\frac{(2x+1)u\pi}{2N}\cos\frac{(2y+1)v\pi}{2N} \quad (5)$$

Then we have:

$$f_0(x,y)=f(x,y)+\Delta(x,y) \quad (6)$$

From equation (6), we have f(x, y)=f$_0$(x, y)−Δ(x, y). We then have the following bound:

$$\text{Max}(f(x,y))=\text{Max}(f_0(x,y))+\text{Max}(\Delta(x,y)) \quad (7)$$

since Δ(x, y) can be negative or positive according to equation (5). If it can be assumed that the bitstream is received from an MPEG-2 encoder that does not disturb f$_0$(x, y) (i.e. the encoder won't change the residuals in inter-coded blocks or pixel values in intra-coded blocks), then it can be assumed that f$_0$(x, y) will be in the range of [−255,255] for residuals in inter-coded blocks and [0,255] for pixel values in intra-coded blocks. With some derivations, using these assumptions, the following equation for Max(Δ(x, y)) can be derived:

$$\text{Max}(\Delta(x, y)) = \quad (8)$$

$$\frac{q}{16N}\sum_{u,v=0}^{N-1} C(u)C(v)w(u,v)\left|\cos\frac{(2x+1)u\pi}{2N}\cos\frac{(2y+1)v\pi}{2N}\right|$$

where each 5[u, v] gets the maximum value 0.5 and with $$\cos\frac{(2x+1)u\pi}{2N}\cos\frac{(2y+1)v\pi}{2N}$$

always positive. Equation (8) thus gives the maximum possible offset to the maximum original values f$_0$(x, y) due to quantization error. While equation (7) and (8) provide the upper bounds for the pixel values or residual values in all (x,y) positions in the spatial domain of an 8×8 block, for efficient implementation, we can relax the upper bound for all positions by getting the max over all the positions. This provides an upper bound for all positions of:

$$\text{UpperBound}=C+q\max_{x,y}(\text{Max}(\Delta(x,y))/q)=C+qB \quad (9)$$

where C is 255 for both inter- and intra-coded blocks, and B can be calculated for each quantization weight matrix as:

$$B = \frac{1}{16N}\sum_{u,v=0}^{N-1} C(u)C(v)w(u,v)\left|\cos\frac{(2x+1)u\pi}{2N}\cos\frac{(2y+1)v\pi}{2N}\right| \quad (10)$$

Also, using similar derivations, the lower bound can be found to be:

$$\text{LowerBound}=K-q\max_{x,y}(\text{Max}(\Delta(x,y))/q)=K-qB \quad (11)$$

where K is −255 for inter-coded blocks and 0 for intra-coded blocks.

Effects of Saturation and Mismatch Control on the Bounds

The above derivation did not take into account the common use of saturation and mismatch control in MPEG-2 bitstreams. However, as we show here, saturation has no effect on the bounds and mismatch control has a limited, and accountable, effect on them. Saturation, in one MPEG-2 implementation, is simply an operation to ensure that all inverse DCT coefficients fall within the range [−2048, 2047]. Mismatch control is a process which attempts to force varying methods of iDCT into generating the similar results by performing a process known as "oddification" to DCT coefficients. Both processes are performed in known MPEG-2 encoders.

According to the MPEG-2 specification:

$$F_0''(u,v) = \frac{2}{N}C(u)C(v)\sum_{x,y=0}^{N-1} f_0(x,y)\cos\frac{(2x+1)u\pi}{2N}\cos\frac{(2y+1)v\pi}{2N} \quad (12)$$

where F$_0$" (u, v) is defined as above is the original DCT coefficient before quantization, and f$_0$(x, y) is the original pixel value. F$_0$" (u, v) is in the range of [−2040, 2040], again assuming no disturbing in f$_0$(x, y) in the MPEG-2 encoder. Then according to equation (1) and (2):

$$F''(u,v)=F_0''(u,v)-2\delta[u,v]w(u,v)q/32 \quad (13)$$

Whenever the saturation in MPEG-2 specification happens on F" (u, v), it is equivalent to saturate the quantization error:

$$\text{Saturation}(F''(u,v))=F_0''(u,v)+2\times\text{Saturation}(-\delta[u,v])\times w(u,v)q/32 \quad (14)$$

The Saturation( ) operator on −δ[u, v] only makes its absolute value become smaller, and thus will not affect the upper/lower bounds derived above The mismatch control in the MPEG-2 specification will either add 1 or −1 on top of the saturated F" (7,7) or keep its value the same. IF we assume the mismatch control adds additional error besides the quantization step, we can adjust the upper/lower bound in equation (9) and (11) by the following constant:

$$\varepsilon(x,y) = 0.25\cos\frac{(14x+7)\pi}{16}\cos\frac{(14y+7)\pi}{16} \quad (15)$$

This can then be relaxed again by taking the maximum value over all spatial positions:

$$\epsilon = {}_{x,y}\text{max}\varepsilon(x,y) = 0.25\cos^2\frac{\pi}{16} = 0.2405 \quad (16)$$

Using this value, we can add the additional potential error caused by mismatch control on top of the two bounds described above in Equations (9) and (11). These then become:

$$\text{UpperBound}=C+\epsilon+q\max_{x,y}(\text{Max}(\Delta(x,y))/q)=C+\epsilon+qB \quad (17)$$

$$\text{LowerBound}=C-\epsilon-q\max_{x,y}(\text{Max}(\Delta(x,y))/q)=C-\epsilon-qB \quad (18)$$

where B is computed as above.

Examples of Spatial Domain Error Detection

Using Equations (17) and (18) above, the process of detecting corrupt blocks can be described. FIG. 6 illustrates an example process 600 for determining if a syntactically-correct block of quantized coefficients has coefficients which are out-of-bounds and which thus need concealment.

The process beings at block 610, where the block of quantized coefficients is dequantized. Next, at block 620, these coefficients are inverse transformed, using iDCT, to produce iDCT coefficients in a spatial domain. These coefficients will typically represent pixel values and residual values.

Next, at block 630, the upper and lower spatial coefficient values are computed using the quantization matrix for the block. As discussed above, while this computation is illustrated as happening after each block is dequantized, for the sake of simple illustration, this may be done before receipt of the block. For example, for a given sequence, quantization matrices are fixed for intra, non-intra, luma, and chroma coefficients. Therefore, for each sequence, the coefficient bounds checkers can pre-compute B using equation (10) above.

Indeed, for each block, the bounds checker also knows the quantization scaler q. Thus, the bounds checker can know the upper and lower coefficient bounds for each coefficient in an 8×8 block after B with q for each block. Thus, these values can be pre-computed, then after iDCT of each block at illustrated block 620, the bounds checker can check whether each coefficient in the block exceeds the bounds using Equations (17) and (18). Finally, at block 640, the bounds checker compares coefficients in the block to the bounds. If one or more exceed the bounds, this means that the block is corrupted and that the decoder should conceal the block.

Error Detection in the Frequency Domain

FIG. 7 illustrates an example process 700 for determining, by consulting coefficients in the frequency domain, if a syntactically-correct block of quantized coefficients has coefficients which are out-of-bounds and which thus need concealment. This is performed, for example, in a decoder implementing DXVA iDCT. In such a decoder, it is not desirable to calculate spatial coefficients, e.g. the quantized reconstruction f (x, y) to perform error detection. Instead, these calculations will be done in hardware. Thus, it is desirable to detect possible errors in the frequency domain, before blocks are sent to hardware.

Inverse quantization arithmetic is only bounded within [−2048, 2047]. In addition, saturation operation can prevent checking each individual coefficient. Instead, in the frequency domain, the bounds checker check the energy of all the coefficients in a block. Because each iDCT coefficient is bounded, the overall energy of a block is also bounded. According to Parseval's theorem, the energy in frequency domain equals the energy in spatial domain. Therefore, the overall energy in frequency domain has the bound:

$$\Sigma_{u,v}|F(u,v)|^2 = \Sigma_{x,y}|f(x,y)|^2 \leq \Sigma_{x,y}(M+q\max(\Delta(x,y)/q))^2 \quad (19)$$

where M is C+ϵ according to equation (17). Comparing Equation (19) to equation (17), it may be noted that $\Delta(x, y)$ is not relaxed over all spatial positions (x, y), i.e. Equation (19) doesn't get the maximum value for Max($\Delta$(x, y)) over all (x, y). Instead it achieves only the maximum value Max($\Delta$(x, y)) at each spatial position (x, y). For a given sequence, the quantization matrix is fixed and the bound for DCT energy becomes:

$$\Sigma_{u,v}|F(u,v)|^2 \leq M^2 + 2qM\Sigma_{x,y}\max(\Delta(x,y)/q) + q^2\Sigma_{x,y}\max(\Delta(x,y)/q)^2 \quad (20)$$

where $\Sigma_{x,y}\max(\Delta(x, y)/q)$ and $\Sigma_{x,y}\max(\Delta(x,y)/q)^2$ can be calculated for each sequence, since they are only dependent on quantization matrices, which are fixed for a given sequence.

Using Equation (20), then, the process of detecting corrupt blocks in a frequency domain can be described. FIG. 7 illustrates an example process 700 for determining if a syntactically-correct block of frequency coefficients has coefficients which are out-of-bounds and which thus need concealment.

The process beings at block 710, where the block of quantized coefficients is dequantized, producing DCT coefficients in a frequency domain. Next, at block 730, the upper energy coefficient bound is computed using the quantization matrix for the block. Here again, by assume a quantization scaler q value of 1, the bounds checker can pre-compute the bound for the whole sequence, since the quantization matrix is fixed for the whole sequence. At each block, the bounds checker can adjust the bound according the quantization scaler q, which is the work done in block 730. Then, after dequantization of each block at illustrated block 710, the bounds checker can check whether the block of DCT coefficients exceeds the bounds using Equation (20). Finally, at block 740, the bounds checker compares the block of coefficients to the upper bound. If the block exceeds the bound, the block is then concealed.

Examples of Detection of the Error Detection Techniques

Because the error-detection techniques described herein can detect errors that might otherwise go unnoticed, judicious use of a deliberately-corrupted MPEG-2 bitstream can demonstrate whether or not a given encoder is implementing these error detection techniques.

For example, one can, on purpose, encode an all-black P-frame, motion compensated from another black I frame. In one macroblock of this black P-frame, such as the first macroblock in some slice which is not skipped, Huffman codes can be manually inserted which match iDCT coefficients according to MPEG-2 specification but which exceed the bounds described above in Equations (17) and (18) for quantization scaler for the macroblock and the quantization matrix for the sequence. The inserted corrupt codes can also be chosen such that the energy of the coefficients in the macroblock also exceeds the energy bounds of Equation (20).

During decoding of such a macroblock, if the decoder is implementing the error detection techniques described herein, then the decoder will perform error concealment for the macroblock and the color in the macroblock will be black, which is desirable. Otherwise, if no error is detected, the color of the macroblock will be white. From these decoded results, one can tell whether these techniques are being implemented or not.

We claim:

1. A method for determining in a video decoder if a video block contains an error, the method comprising:
   receiving compressed video information in a bitstream for the video block;
   computing a coefficient bound associated with coefficients of the video block using per transform coefficient weights based at least in part on a quantization matrix for the video block, the per transform coefficient weights depending on the quantization matrix and indicating coarseness of quantization during compression of the video information;
   detecting errors in the compressed video information in the bitstream for the video block by:
      checking whether any of the coefficients of the video block are out of bounds of a range for correct decoding of the video block, including comparing at least some of the coefficients of the video block to the coefficient bound; and
determining that one or more of the coefficients of the video block are in error based on the comparison to the coefficient bound.

2. The method of claim 1, wherein the coefficient bound is an upper bound.

3. The method of claim 1, wherein the coefficient bound is a lower bound.

4. The method of claim 1, wherein the coefficients of the video block are dequantized coefficients, and wherein:
the video block comprises quantized coefficients in the bitstream for the video block;
the method further comprises dequantizing the quantized coefficients of the video block using the quantization matrix to derive the dequantized coefficients in a frequency domain;
the coefficient bound is an energy bound in the frequency domain; and
the dequantized coefficients are compared to the energy bound in the frequency domain.

5. The method of claim 4, wherein the coefficient bound is an energy bound for the video block.

6. The method of claim 4, wherein the coefficients are compared in the frequency domain before being input into a hardware-assisted inverse transform process.

7. The method of claim 6, wherein the hardware-assisted inverse transform process uses a video acceleration interface.

8. The method of claim 1, wherein the coefficients of the video block are spatial coefficients, and wherein:
the video block comprises quantized coefficients in the bitstream for the video block;
the method further comprises:
dequantizing the quantized coefficients of the video block using the quantization matrix to derive dequantized coefficients in a frequency domain; and
inverse transforming the dequantized coefficients to derive the spatial coefficients of the video block;
the coefficient bound is a spatial coefficient bound; and
the spatial coefficients are compared to the coefficient bound in a spatial domain.

9. The method of claim 1, further comprising, after determining that one or more of the coefficients are in error, concealing the video block.

10. The method of claim 1, wherein the video block is syntactically correct.

11. The method of claim 1, wherein the video block is an intra block.

12. The method of claim 1, wherein the video block is an inter block.

13. The method of claim 1, wherein the coefficient bound is computed before receiving the compressed video information for the video block.

14. The method of claim 1, wherein the quantization matrix indicates, for each of multiple coefficient frequencies of the video block, a weight for inverse quantization.

15. The method according to claim 1, wherein the computing of the coefficient bound is further based on quantization error in the spatial domain during compression of the video information.

16. A method for detecting an error in a syntactically-correct MPEG-2 bitstream in a video decoder, the method comprising:
receiving compressed video information for a syntactically-correct block of an MPEG-2 bitstream, the block associated with a quantization matrix and a quantization scaler for scaling quantized transform coefficients of the block;
computing an upper coefficient bound and a lower coefficient bound for a block of spatial coefficients from per transform coefficient weights based on the quantization matrix and the quantization scaler, the per transform coefficient weights depending on the quantization matrix and indicating coarseness of quantization during compression of the video information;
performing dequantization and inverse discrete cosine transform on the block of the MPEG-2 bitstream to generate the block of spatial coefficients;
detecting errors in the compressed video information in the bitstream for the block by checking whether any spatial coefficients in the block are out of bounds of a range for correct decoding of the block, wherein the checking includes comparing the spatial coefficients in the block with the upper coefficient bound and the lower coefficient bound; and
when at least one of the spatial coefficients in the block falls outside of the upper coefficient bound or the lower coefficient bound, concealing the block during display.

17. The method of claim 16, wherein the quantization matrix indicates, for each of multiple coefficient frequencies of the video block, a weight for inverse quantization.

18. The method according to claim 16, wherein the computing of the upper coefficient bound and the lower coefficient bound is further based on quantization error in the spatial domain during compression of the video information.

19. One or more computer-readable media selected from the group consisting of: volatile memory, non-volatile memory, magnetic disk storage, magnetic tape storage, CD-ROM, DVD, and Blu-Ray disc, the one or more computer-readable media storing computer-executable instructions which, when executed, cause a computing device programmed thereby to perform operations to determine in a video decoder if a video block in a video bitstream contains an error, the operations comprising:
receiving compressed video information in the video bitstream for the video block;
dequantizing the video block using a quantization matrix;
computing one or more coefficient bounds associated with coefficients of the video block using per transform coefficient weights based at least in part on the quantization matrix;
detecting errors in the compressed video information in the bitstream for the video block by:
checking whether any of the coefficients of the video block are out of bounds of a range for correct decoding of the video block, including comparing at least some of the coefficients of the video block to the one or more coefficient bounds; and
determining that one or more of the coefficients of the video block are in error based on the comparison to the one or more coefficient bounds; and
concealing the block when rendering.

20. The one or more computer-readable media of claim 19, wherein:
the one or more coefficient bounds comprise an upper energy bound in a frequency domain; and
the coefficients are compared to the upper energy bound in the frequency domain.

21. The one or more computer-readable media of claim 20, wherein the coefficients are compared in the frequency domain before being input into a hardware-assisted inverse transform process.

22. The one or more computer-readable media of claim 19, wherein the coefficients of the video block are spatial coefficients, and wherein:
- the operations further comprise inverse transforming dequantized coefficients of the video block to derive the spatial coefficients of the video block;
- the one or more coefficient bounds are an upper spatial coefficient bound and a lower spatial coefficient bound; and
- the spatial coefficients are compared to the upper spatial coefficient bound and the lower spatial coefficient bound in a spatial domain.

23. The one or more computer-readable media of claim 19, wherein the quantization matrix indicates, for each of multiple coefficient frequencies of the video block, a weight for inverse quantization.

\* \* \* \* \*